United States Patent
Fritzon et al.

(10) Patent No.: US 11,719,409 B2
(45) Date of Patent: Aug. 8, 2023

(54) VEHICLE LIGHT ASSEMBLY INCLUDING A MOVABLE LIGHT SIGNATURE MEMBER

(71) Applicant: Volvo Car Corporation, Gothenburg (SE)

(72) Inventors: Jan-Erik Fritzon, Torslanda (SE); Berk Keskin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/729,032

(22) Filed: Apr. 26, 2022

(65) Prior Publication Data
US 2022/0252235 A1  Aug. 11, 2022

Related U.S. Application Data

(63) Continuation of application No. 16/367,971, filed on Mar. 28, 2019, now Pat. No. 11,346,519.
(Continued)

(51) Int. Cl.
*F21S 41/657* (2018.01)
*F21S 43/14* (2018.01)
(Continued)

(52) U.S. Cl.
CPC .............. *F21S 41/657* (2018.01); *B60Q 1/14* (2013.01); *F21S 41/141* (2018.01);
(Continued)

(58) Field of Classification Search
CPC ...... F21S 41/657; F21S 41/698; F21S 41/683; F21S 41/689; F21S 41/686; F21S 41/141;
(Continued)

(56) References Cited

U.S. PATENT DOCUMENTS 8,475,022 B2   7/2013  Singh
8,496,365 B2   7/2013  Singh
(Continued)

FOREIGN PATENT DOCUMENTS

CN      101311619 B      12/2011
DE   102010010908 A1 *   9/2011   .......... F21S 48/1241
(Continued)

OTHER PUBLICATIONS

Notice of References.
Apr. 20, 2020 European Search Report issued on International Application No. 19210615.

*Primary Examiner* — Erin Kryukova
(74) *Attorney, Agent, or Firm* — Clements Bernard Walker; Christopher L. Bernard

(57) ABSTRACT

A vehicle light assembly including one or more movable light signature members that are selectively translated from a first position partially or wholly in front of conventional light units (low beams, high beams, taillights, etc.) to a second position away from the light units when the light units are in use. Thus, for example, the movable light signature member(s) can include one or more LEDs or the like that are illuminated to act as daytime running lights, turn signal indicators, accessory lights, etc. when they are disposed in front of the light units and when the low beams, high beams, or taillights are not in use. This provides the desired light signature. When the low beams, high beams, or taillights are in use, the movable light signature member(s) are translated out of the way, such that the light units are visible adjacent to and/or between the movable light signature member(s).

18 Claims, 20 Drawing Sheets

Related U.S. Application Data

(60) Provisional application No. 62/774,457, filed on Dec. 3, 2018.

(51) Int. Cl.

| | | |
|---|---|---|
| *F21S 41/141* | (2018.01) | |
| *B60Q 1/14* | (2006.01) | |
| *F21S 41/689* | (2018.01) | |
| *F21S 41/698* | (2018.01) | |
| *F21S 41/683* | (2018.01) | |
| *F21Y 103/10* | (2016.01) | |
| *F21Y 115/10* | (2016.01) | |
| *F21W 103/20* | (2018.01) | |
| *F21W 103/55* | (2018.01) | |
| *B60Q 1/04* | (2006.01) | |
| *B60Q 1/30* | (2006.01) | |

(52) U.S. Cl.
CPC ........... *F21S 41/683* (2018.01); *F21S 41/689* (2018.01); *F21S 41/698* (2018.01); *F21S 43/14* (2018.01); *B60Q 1/04* (2013.01); *B60Q 1/30* (2013.01); *F21W 2103/20* (2018.01); *F21W 2103/55* (2018.01); *F21Y 2103/10* (2016.08); *F21Y 2115/10* (2016.08)

(58) Field of Classification Search
CPC .. F21S 43/14; B60Q 1/04; B60Q 1/14; B60Q 1/30; B60Q 1/2693; B60Q 1/05; B60Q 1/2692; B60Q 1/0058; B60Q 1/1438; F21W 2103/20; F21W 2103/55; F21Y 2103/10; F21Y 2115/10; F21V 11/18; F21V 14/02; F21V 14/08
See application file for complete search history.

(56) References Cited

U.S. PATENT DOCUMENTS

| | | | |
|---|---|---|---|
| 2012/0051070 A1* | 3/2012 | Bakacha | B60Q 1/05 362/464 |
| 2013/0141928 A1* | 6/2013 | Puente | F21S 43/37 362/235 |
| 2014/0063834 A1* | 3/2014 | Guan | F21S 41/657 362/523 |
| 2015/0092436 A1* | 4/2015 | King | F21S 41/663 362/513 |
| 2017/0066369 A1 | 3/2017 | Ruat et al. | |
| 2017/0089538 A1* | 3/2017 | Wasilewski | F21S 41/657 |
| 2017/0174121 A1* | 6/2017 | Wasilewski | B60Q 1/04 |

FOREIGN PATENT DOCUMENTS

| | | |
|---|---|---|
| EP | 2799286 A1 | 7/1957 |
| KR | 101361090 B1 | 2/2014 |

* cited by examiner

VEHICLE LIGHT ASSEMBLY INCLUDING A MOVABLE LIGHT SIGNATURE MEMBER

CROSS-REFERENCE TO RELATED APPLICATION

The present patent application/patent is a continuation (CON) of co-pending U.S. patent application Ser. No. 16/367,971, filed on Mar. 28, 2019, and entitled "VEHICLE LIGHT ASSEMBLY INCLUDING A MOVABLE LIGHT SIGNATURE MEMBER," which claims the benefit of priority of U.S. Provisional Patent Application No. 62/774,457, filed on Dec. 3, 2018, and entitled "VEHICLE HEADLAMP ASSEMBLY AND METHOD INCORPORATING MOVABLE LIGHT SIGNATURE," the contents of both of which are incorporated in full by reference herein.

TECHNICAL FIELD

The present invention relates generally to the automotive field. More specifically, the present invention relates to a vehicle light assembly including a movable light signature member.

BACKGROUND ART

It is now common for vehicle headlights and/or taillights to incorporate various arrangements of light-emitting diodes (LEDs) or the like that serve as "light signatures," allowing for the rapid identification and recognition of a vehicle make/model when illuminated. While serving as an effective marketing tool, such light signatures can also provide legally required safety equipment, acting as daytime running lights, turn signal indicators, accessory lights, etc. These light signatures are typically disposed around the periphery of the conventional light assemblies, often within the same housing and behind the same lens. Thus, the light signatures are often contained within and installed as part of a unitary headlight or taillight assembly or module.

Disadvantageously, the light signatures require space in or around the housing, and around the conventional light assemblies, thereby increasing the size factor of the headlight or taillight assemblies or modules. This also undesirably limits design flexibility. It is therefore desirable to better integrate such light signatures into the overall headlight or taillight assemblies or modules. This is accomplished by the movable light signature member(s) provided herein.

SUMMARY

The vehicle light assembly provided herein includes one or more movable light signature members that are selectively translated from a first position partially or wholly in front of the conventional light units (low beams, high beams, taillights, etc.) to a second position away from the light units when the light units are in use. Thus, for example, the movable light signature member(s) can include one or more LEDs or the like that are illuminated to act as daytime running lights, turn signal indicators, accessory lights, etc. when they are disposed in front of the light units and when the low beams, high beams, or taillights are not in use. This provides the desired light signature. When the low beams, high beams, or taillights are in use, the movable light signature member(s) are translated out of the way, such that the light units are visible adjacent to and/or between the movable light signature member(s). The movable light signature member(s) can include a single light signature member disposed in each housing that is translated either vertically or horizontally to expose the underlying light unit or units. Alternatively, the movable light signature member(s) can include multiple light signature members disposed in each housing that are translated apart to expose the underlying light unit or units. Each movable light signature member can be translated to a position where it is still visible and illuminated when the underlying light unit or units are illuminated, or each movable light signature member can be translated to a position where it is not visible and/or not illuminated when the underlying light unit or units are illuminated. Optionally, light signature provided herein also incorporates one or more stationary members that also form part of each daytime running light, turn signal indicator, accessory light, etc.

In most of the examples provided herein, a pair of horizontal movable light signature members disposed adjacent to a stationary vertical light signature member are illustrated and described. These horizontal movable light signatures members part vertically to expose the underlying low beam and high beam light units. The light signature members collectively operate as the daytime running light, turn signal indicator, position light, and/or welcome light in a headlight assembly. All components are disposed in a modular housing and covered by a lens structure. The actuation mechanism(s) operable for translating the horizontal movable light signature members are included as part of this modular housing, optionally including the associated actuation motor(s), which are then coupled to the electrical and control systems of the vehicle.

It will be readily apparent to those of ordinary skill in the art that different numbers and configurations of movable and stationary light signature members could be used equally, and provide different illumination functions. For example, the concepts provided herein could apply to "point" signature members (as opposed to "linear" signature members), taillight assemblies, etc.

In one exemplary embodiment, the vehicle light assembly provided herein includes: a housing defining an opening; an optically transparent lens cover coupled to the housing and enclosing the opening defined by the housing; one or more of a low beam unit and a high beam unit (or a generic light unit) disposed within the housing; one or more movable light signature members disposed within the housing, wherein the one or more movable light signature members are adapted to be moved from a closed position between the one or more of the low beam unit and the high beam unit and the optically transparent lens cover and along a light projection path of the one or more of the low beam unit and the high beam unit to an open position removed from the light projection path of the one or more of the low beam unit and the high beam unit. Optionally, the one or more light signature members include a first movable light signature member and a second movable light signature member, wherein the first movable light signature member and the second movable light signature member are adapted to be moved from a closed position adjacent to one another and between the one or more of the low beam unit and the high beam unit and the optically transparent lens cover and along the light projection path of the one or more of the low beam unit and the high beam unit to an open position spaced apart from one another and removed from the light projection path of the one or more of the low beam unit and the high beam unit.

In another exemplary embodiment, the vehicle light signature assembly provided herein includes: one or more movable light signature members, wherein the one or more movable light signature members are adapted to be moved from a closed position between one or more of a low beam unit and a high beam unit (or a generic light unit) of a vehicle light assembly and an optically transparent lens cover of the vehicle light assembly and along a light projection path of the one or more of the low beam unit and the high beam unit to an open position removed from the light projection path of the one or more of the low beam unit and the high beam unit. Optionally, the one or more light signature members include a first movable light signature member and a second movable light signature member, wherein the first movable light signature member and the second movable light signature member are adapted to be moved from a closed position adjacent to one another and between the one or more of the low beam unit and the high beam unit of the vehicle light assembly and the optically transparent lens cover of the vehicle light assembly and along the light projection path of the one or more of the low beam unit and the high beam unit to an open position spaced apart from one another and removed from the light projection path of the one or more of the low beam unit and the high beam unit.

In a further exemplary embodiment, a computer software product including a non-transitory computer readable medium having instructions stored thereon and executed to cause a processor to actuate a vehicle light signature assembly is provided, including: upon determining that operation of one or more of a low beam unit and a high beam unit (or a generic light unit) of a vehicle light assembly is desired, moving the one or more movable light signature members from a closed position between one or more of the low beam unit and the high beam unit and an optically transparent lens cover of the vehicle light assembly and along a light projection path of the one or more of the low beam unit and the high beam unit to an open position removed from the light projection path of the one or more of the low beam unit and the high beam unit; and, upon determining that the operation of the one or more of the low beam unit and the high beam unit is not desired, moving the one or more movable light signature members from the open position removed from the light projection path of the one or more of the low beam unit and the high beam unit to the closed position between the one or more of the low beam unit and the high beam unit and the optically transparent lens cover and along the light projection path of the one or more of the low beam unit and the high beam unit. The computer software product is further operable for selectively enabling/disabling operation of one or more light-emitting devices associated with the one or more movable light signature members and the one or more of the low beam unit and the high beam unit.

BRIEF DESCRIPTION OF THE DRAWINGS

The present invention is illustrated and described herein with reference to the various drawings, in which like reference numbers are used to denote like assembly components/algorithm steps, as appropriate, and in which.

DETAILED DESCRIPTION OF EMBODIMENTS

Figure 1:
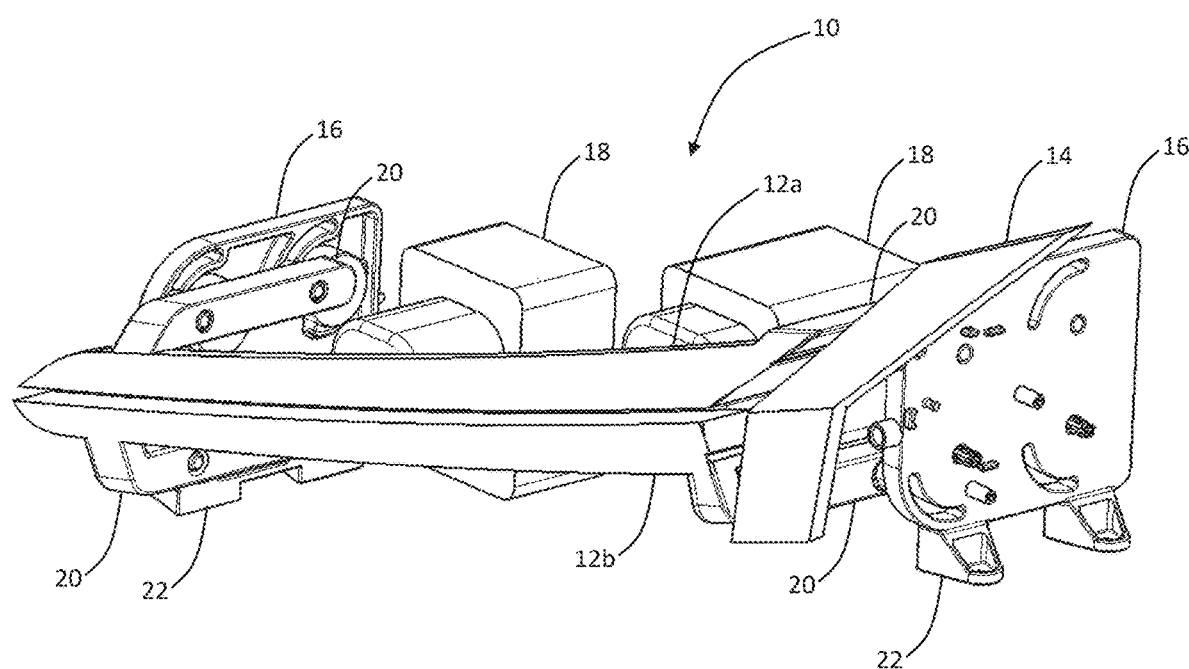
FIG. 1 is a partial front perspective view of one exemplary embodiment of the vehicle light assembly provided herein, incorporating a pair of horizontal movable light signature members, a vertical stationary light signature member, low beam/high beam light units, and a pair of actuation mechanisms, in a closed configuration.

The vehicle light assembly provided herein includes one or more movable light signature members that are selectively translated from a first position partially or wholly in front of the conventional light units (low beams, high beams, taillights, auxiliary lights, etc.) to a second position away from the light units when the light units are in use. Thus, for example, the movable light signature member(s) can include one or more LEDs or the like that are illuminated to act as daytime running lights, turn signal indicators, accessory lights, etc. when they are disposed in front of the light units and when the low beams, high beams, taillights, or auxiliary lights are not in use. This provides the desired light signature. When the low beams, high beams, taillights, or auxiliary lights are in use, the movable light signature member(s) are translated out of the way, such that the light units are visible adjacent to and/or between the movable light signature member(s). The movable light signature member(s) can include a single light signature member disposed in each housing that is translated either vertically or horizontally to expose the underlying light unit or units. Alternatively, the movable light signature member(s) can include multiple light signature members disposed in each housing that are translated apart to expose the underlying light unit or units. Each movable light signature member can be translated to a position where it is still visible and illuminated when the underlying light unit or units are illuminated, or each movable light signature member can be translated to a position where it is not visible and/or not illuminated when the underlying light unit or units are illuminated. Optionally, light signature provided herein also incorporates one or more stationary members that also form part of each daytime running light, turn signal indicator, accessory light, etc.

In most of the examples provided herein, a pair of horizontal movable light signature members disposed adjacent to a stationary vertical light signature member are illustrated and described. These horizontal movable light signatures members part vertically to expose the underlying low beam and high beam light units. The light signature members collectively operate as the daytime running light, turn signal indicator, position light, and/or welcome light in a headlight assembly. All components are disposed in a modular housing and covered by a lens structure. The actuation mechanism(s) operable for translating the horizontal movable light signature members are included as part of this modular housing, optionally including the associated actuation motor(s), which are then coupled to the electrical and control systems of the vehicle.

It will be readily apparent to those of ordinary skill in the art that different numbers and configurations of movable and stationary light signature members could be used equally, and provide different illumination functions. For example, the concepts provided herein could apply to "point" signature members (as opposed to "linear" signature members), taillight assemblies, etc.

Figure 2:
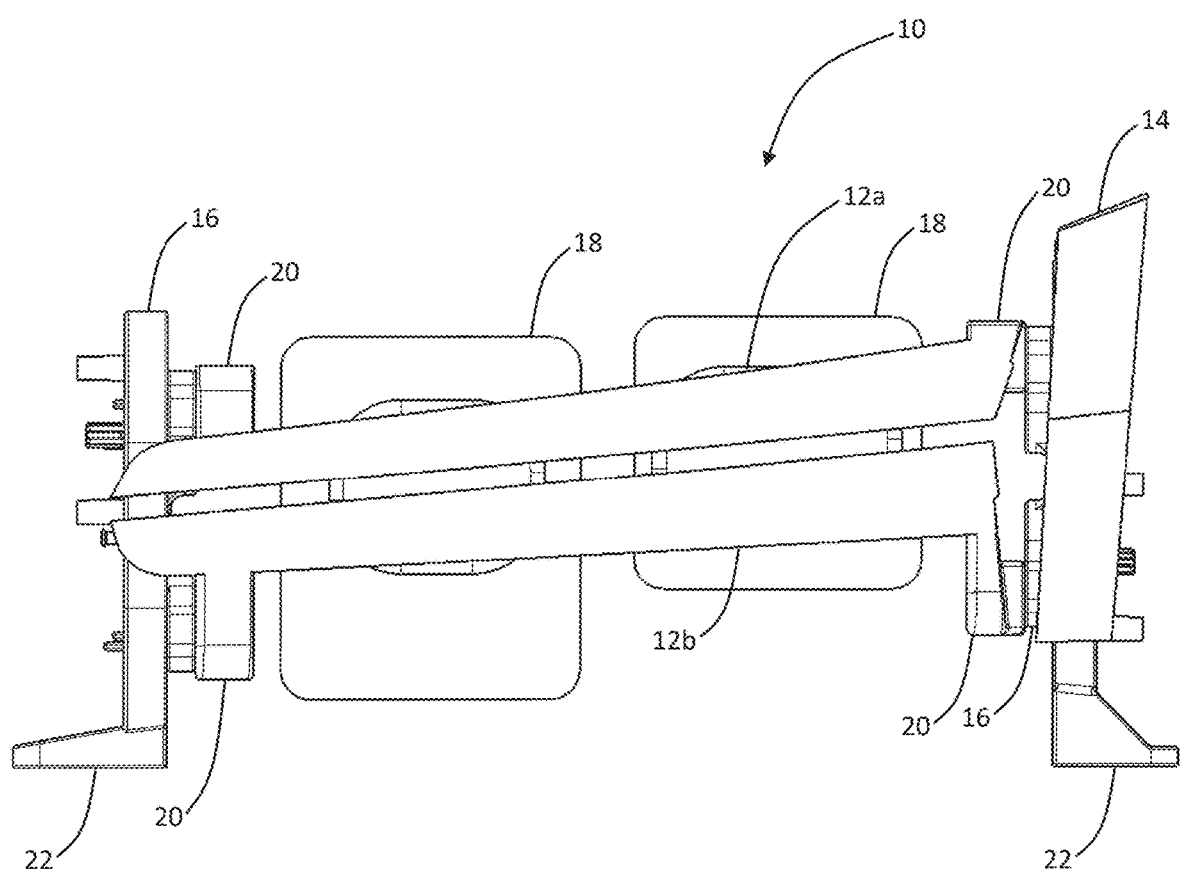
FIG. 2 is a partial front planar view of one exemplary embodiment of the vehicle light assembly provided herein, incorporating a pair of horizontal movable light signature members, a vertical stationary light signature member, low beam/high beam light units, and a pair of actuation mechanisms, in a closed configuration.

Referring now specifically to FIGS. 1 and 2, in one exemplary embodiment, the vehicle light assembly 10 includes a pair of horizontal movable light signature members 12a, 12b, a vertical stationary light signature member 14, a pair of actuation mechanisms 16 disposed at either end of the horizontal movable light signature members 12a,12b, and a pair of low beam/high beam units 18 disposed behind the horizontal movable light signature members 12a,12b when the horizontal movable light signature members 12a, 12b are in a closed configuration, as illustrated. In this closed configuration, the horizontal movable light signature members 12a,12b are disposed in close proximity to one another and generally block the light projection paths of the low beam/high beam units 18, essentially forming a unitary light signature in front of the low beam/high beam units 18. Each of the above components is discussed in detail herein below. Preferably, all of the components are disposed within and/or form part of an enclosed and/or sealed housing (not illustrated) and optically transparent lens cover (not illustrated), both of which are well known to those of ordinary skill in the art. This forms a modular unit that can readily be installed in a vehicle, as conventional light assemblies are.

Each of the horizontal movable light signature members 12a,12b is manufactured from a rigid plastic material or the like and incorporates a plurality of LEDs, an LED light tube, or the like suitable for forming a light signature when powered and activated. Although elongate prismatic structures are illustrated, any suitable shapes and configurations may be utilized. For example, the movable light signature members 12a,12b may be substantially cylindrical, arranged vertically instead of horizontally, provide single points of light instead of linear displays, etc., provided that they translate when actuated. Further, a single movable light signature member 12a,12b can be utilized, instead of a pair. In the exemplary embodiment illustrated, the horizontal movable light signature members 12a,12b are aligned horizontally and adapted to translate apart from one another vertically, thereby reveling the low beam/high beam units 18 disposed behind the horizontal movable light signature members 12a,12b between the horizontal movable light signature members 12a,12b, such that light may be projected from the low beam/high beam units 18 between the horizontal movable light signature members 12a,12b. Optionally, when the horizontal movable light signature members 12a,12b are deployed, they move vertically up down and are retracted into the housing above/below the low beam/high beam units 18 such that they are no longer visibly illuminated through the lens cover. They may also be shut off when deployed in this manner. Alternatively, when the horizontal movable light signature members 12a,12b are deployed, they are positioned such that they are still partially or wholly visibly illuminated through the lens cover, although in a deployed position. In this case, they are not shut off when deployed.

Functionally, the horizontal movable light signatures members 12a,12b may collectively operate as a daytime running light, a turn signal indicator, a position light, and/or a welcome light when activated.

In this exemplary embodiment, the vertical stationary light signature member 14 is disposed at one end of the horizontal movable light signature members 12a,12b, collectively forming a "t-shaped" light signature. The vertical stationary light signature member 14 is illuminated with one or more LEDs, an LED light tube, or the like accordingly. It will be readily apparent to those of ordinary skill in the art that vertical stationary light signature member 14 does not have to be used or can be otherwise positioned or aligned. In the exemplary embodiment illustrated, the vertical stationary light signature member 14 includes upper and lower portions that are disposed at an angle to one another, although this is not strictly necessary.

Functionally, the vertical stationary light signature member 14 operates as the daytime running light, the turn signal indicator, the position light, and/or the welcome light with the horizontal movable light signature members 12a,12b when activated, or alone when the horizontal movable light signature members 12a,12b are deployed and/or deactivated. The vertical stationary light signature member 14 can also be selectively activated/deactivated. The vertical stationary light signature member 14 is also manufactured from a rigid plastic material or the like and coupled to appropriate power and control systems.

Each of the actuation mechanisms 16 includes a gear assembly, pivot assembly, or track system by which the horizontal movable light signature members 12a,12b are translated and/or rotated from their closed configuration to their open configuration and back again. A gear or pivot assembly is slightly preferred because it provides smooth movement with less binding, although a track system could be used. The best choice of actuation mechanism type is dependent upon the desired direction and manner of deployment of the movable light signature member(s) 12a,12b. In the exemplary embodiment illustrated, each of the horizontal movable light signature members 12a,12b is coupled to the actuation mechanisms by a pair of coupling members 20. It will be readily apparent to those of ordinary skill in the art that only one of the actuation mechanisms 16 may drive the movement of the horizontal movable light signature members 12a,12b, while the other actuation mechanism 16 may simply guide such movement. Optionally, each of the actuation mechanisms 16 includes one or more attachment points 22 by which the light assembly 10 is coupled to the housing, and/or by which the housing is coupled to the vehicle, using screws or the like. The actuation mechanisms 16 may be manufactured from a rigid plastic material or the like, as well as the coupling members 20 and attachment points 22.

The low beam/high beam units 18 disposed behind/between the horizontal movable light signature members 12a,12b, which optionally consist of a single unit, are conventional headlight or taillight units or the like that include a powered point light source, reflector, etc. disposed in a beam housing and configured to project light from a vehicle. These low beam/high beam units 18 may incorporate self-leveling functionality, corner-bending functionality, and the like, all of which are well known to those of ordinary skill in the art. Typically, when these beams are engaged, the daytime running lights and the like are not, although, in certain situations it may be desirable for the horizontal movable light signature members 12a,12b to be on in all positions and configurations. For example, the horizontal movable light signature members 12a,12b could "flash" with the low beam/high beam units 18 even when closed or opened/retracted.

Figure 3:
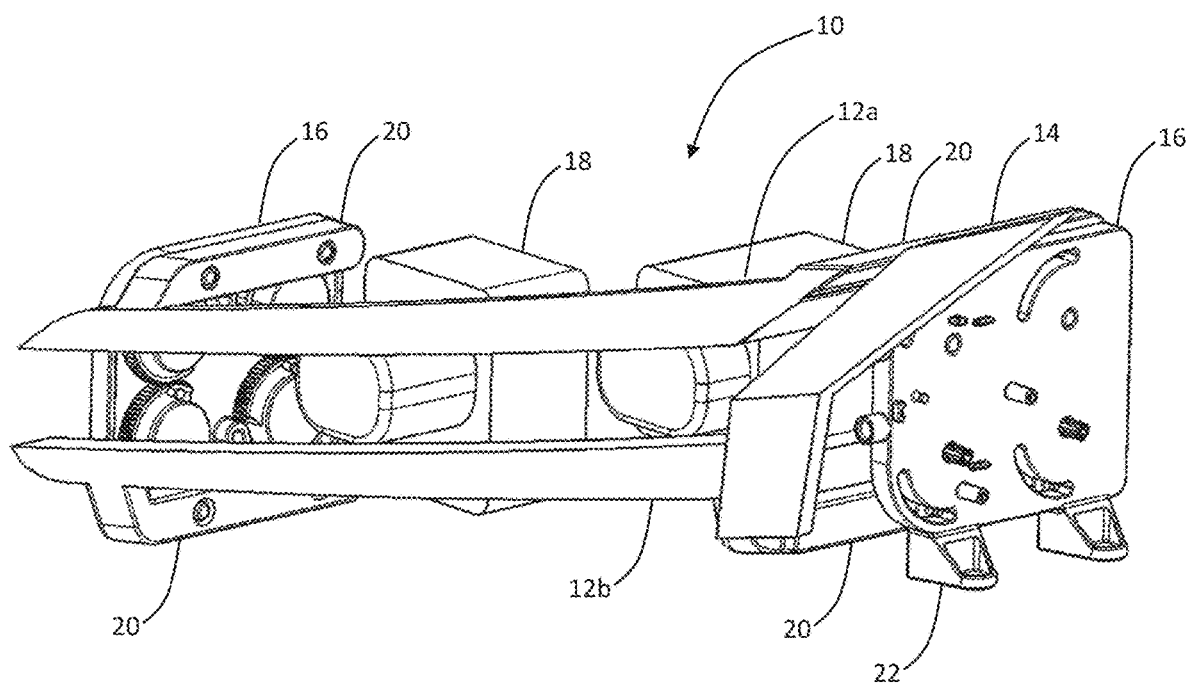
FIG. 3 is a partial front perspective view of one exemplary embodiment of the vehicle light assembly provided herein, incorporating a pair of horizontal movable light signature members, a vertical stationary light signature member, low beam/high beam light units, and a pair of actuation mechanisms, in an open configuration.
Figure 4:
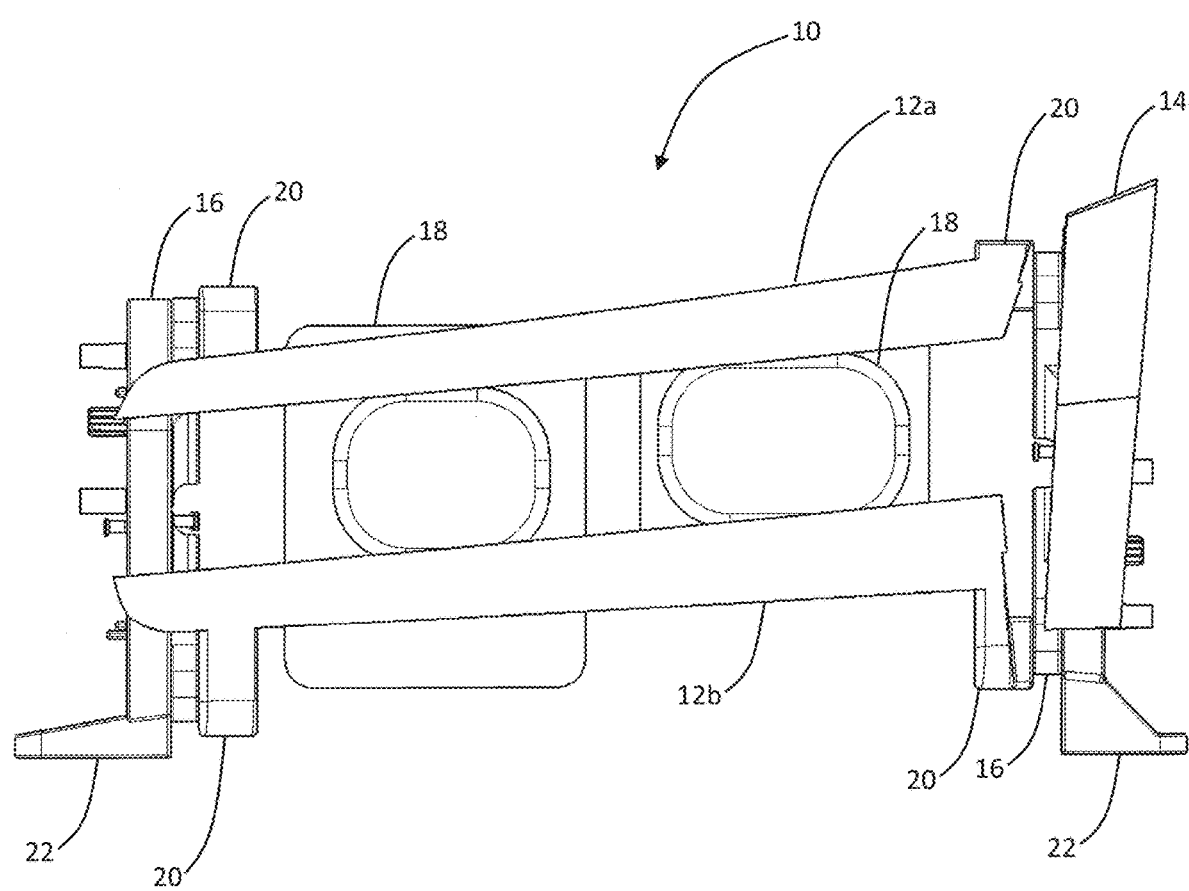
FIG. 4 is a partial front planar view of one exemplary embodiment of the vehicle light assembly provided herein, incorporating a pair of horizontal movable light signature members, a vertical stationary light signature member, low beam/high beam light units, and a pair of actuation mechanisms, in an open configuration.

Referring now specifically to FIGS. 3 and 4, the light assembly 10 is shown in an open configuration, with the horizontal movable light signature members 12a,12b separated from one another and generally allowing the light projection paths of the low beam/high beam units 18 to pass between the horizontal movable light signature members 12a,12b. Again, all of the components are disposed within and/or form part of an enclosed and/or sealed housing (not illustrated) and optically transparent lens cover (not illustrated), both of which are well known to those of ordinary skill in the art. This forms a modular unit that can readily be installed in a vehicle, as conventional light assemblies are.

Each of the horizontal movable light signature members 12a,12b is manufactured from a rigid plastic material or the like and incorporates a plurality of LEDs, an LED light tube, or the like suitable for forming a light signature when powered and activated. Although elongate prismatic structures are illustrated, any suitable shapes and configurations may be utilized. For example, the movable light signature members 12a,12b may be substantially cylindrical, arranged vertically instead of horizontally, provide single points of light instead of linear displays, etc., provided that they translate when actuated. Further, a single movable light signature member 12a,12b can be utilized, instead of a pair. In the exemplary embodiment illustrated, the horizontal movable light signature members 12a,12b are aligned horizontally and adapted to translate apart from one another vertically, thereby reveling the low beam/high beam units 18 disposed behind the horizontal movable light signature members 12a,12b between the horizontal movable light signature members 12a,12b, such that light may be projected from the low beam/high beam units 18 between the horizontal movable light signature members 12a,12b. Optionally, when the horizontal movable light signature members 12a,12b are deployed, they move vertically up down and are retracted into the housing above/below the low beam/high beam units 18 such that they are no longer visibly illuminated through the lens cover. They may also be shut off when deployed in this manner. Alternatively, when the horizontal movable light signature members 12a,12b are deployed, they are positioned such that they are still partially or wholly visibly illuminated through the lens cover, although in a deployed position. In this case, they are not shut off when deployed. In the exemplary embodiment illustrated, the horizontal movable light signature members 12a,12b have a slight downward slope from the end proximate to the vertical stationary light signature member 14 to the end remote from the vertical stationary light signature member 14, although this slight downward slope is optional. Likewise, the vertical stationary light signature member 14 has a slight slope away from the horizontal movable light signature members 12a, 12b, although this slight slope away is also optional.

Functionally, the horizontal movable light signatures members 12a,12b may collectively operate as a daytime running light, a turn signal indicator, a position light, and/or a welcome light when activated.

Again, in this exemplary embodiment, the vertical stationary light signature member 14 and the horizontal movable light signature members 12a,12b, collectively forming a "t-shaped" light signature. The vertical stationary light signature member 14 is illuminated with one or more LEDs, an LED light tube, or the like accordingly. It will be readily apparent to those of ordinary skill in the art that vertical stationary light signature member 14 does not have to be used or can be otherwise positioned or aligned. In the exemplary embodiment illustrated, the vertical stationary light signature member 14 includes upper and lower portions that are disposed at an angle to one another, although this is not strictly necessary.

Functionally, the vertical stationary light signature member 14 operates as the daytime running light, the turn signal indicator, the position light, and/or the welcome light with the horizontal movable light signature members 12a,12b when activated, or alone when the horizontal movable light signature members 12a,12b are deployed and/or deactivated. The vertical stationary light signature member 14 can also be selectively activated/deactivated. The vertical stationary light signature member 14 is also manufactured from a rigid plastic material or the like and coupled to appropriate power and control systems.

Each of the actuation mechanisms 16 includes a gear assembly, pivot assembly, or track system by which the horizontal movable light signature members 12a,12b are translated and/or rotated from their closed configuration to their open configuration and back again. A gear or pivot assembly is slightly preferred because it provides smooth movement with less binding, although a track system could be used. The best choice of actuation mechanism type is dependent upon the desired direction and manner of deployment of the movable light signature member(s) 12a,12b. In the exemplary embodiment illustrated, each of the horizontal movable light signature members 12a,12b is coupled to the actuation mechanisms by a pair of coupling members 20. It will be readily apparent to those of ordinary skill in the art that only one of the actuation mechanisms 16 may drive the movement of the horizontal movable light signature members 12a,12b, while the other actuation mechanism 16 may simply guide such movement. Optionally, each of the actuation mechanisms 16 includes one or more attachment points 22 by which the light assembly 10 is coupled to the housing, and/or by which the housing is coupled to the vehicle, using screws or the like. The actuation mechanisms 16 may be manufactured from a rigid plastic material or the like, as well as the coupling members 20 and attachment points 22.

The low beam/high beam units 18 disposed behind/between the horizontal movable light signature members 12a,12b, which optionally consist of a single unit, are conventional headlight or taillight units or the like that include a powered point light source, reflector, etc. disposed in a beam housing and configured to project light from a vehicle. These low beam/high beam units 18 may incorporate self-leveling functionality, corner-bending functionality, and the like, all of which are well known to those of ordinary skill in the art. Typically, when these beams are engaged, the daytime running lights and the like are not.

Figure 5:
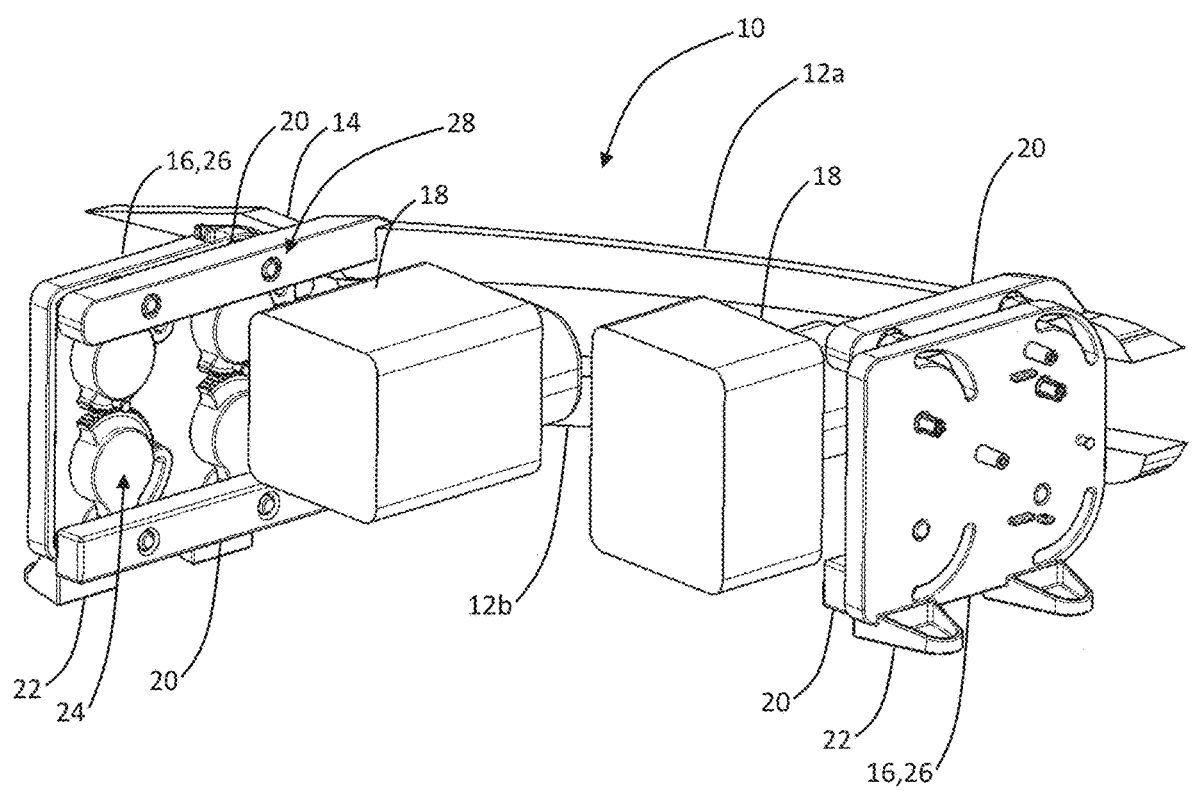
FIG. 5 is a partial back perspective view of one exemplary embodiment of the vehicle light assembly provided herein, incorporating a pair of horizontal movable light signature members, a vertical stationary light signature member, low beam/high beam light units, and a pair of actuation mechanisms, in an open configuration.

FIG. 5 provides a view of the light assembly 10 from the back and highlights the relative position of the low beam/high beam units 18, as well as one exemplary embodiment of the actuation mechanisms 16. In this exemplary embodiment, each actuation mechanism 16 includes a plurality of gears 24 rotatably coupled to a tray structure 26. The coupling members 20 associated with each of the horizontal movable light signature members 12a,12b are pivotably coupled to the plurality of gears 24 via a plurality of pins 28 or the like, such that when the plurality of gears 24 are rotated, the coupling members 20 and associated horizontal movable light signature members 12a,12b are rotated about the plurality of gears 24, actuation mechanisms 16, and low beam/high beam units 18. This is described in greater detail herein. It should be noted that all actuation mechanisms components may be manufactured from a rigid plastic material or the like.

Figure 6:
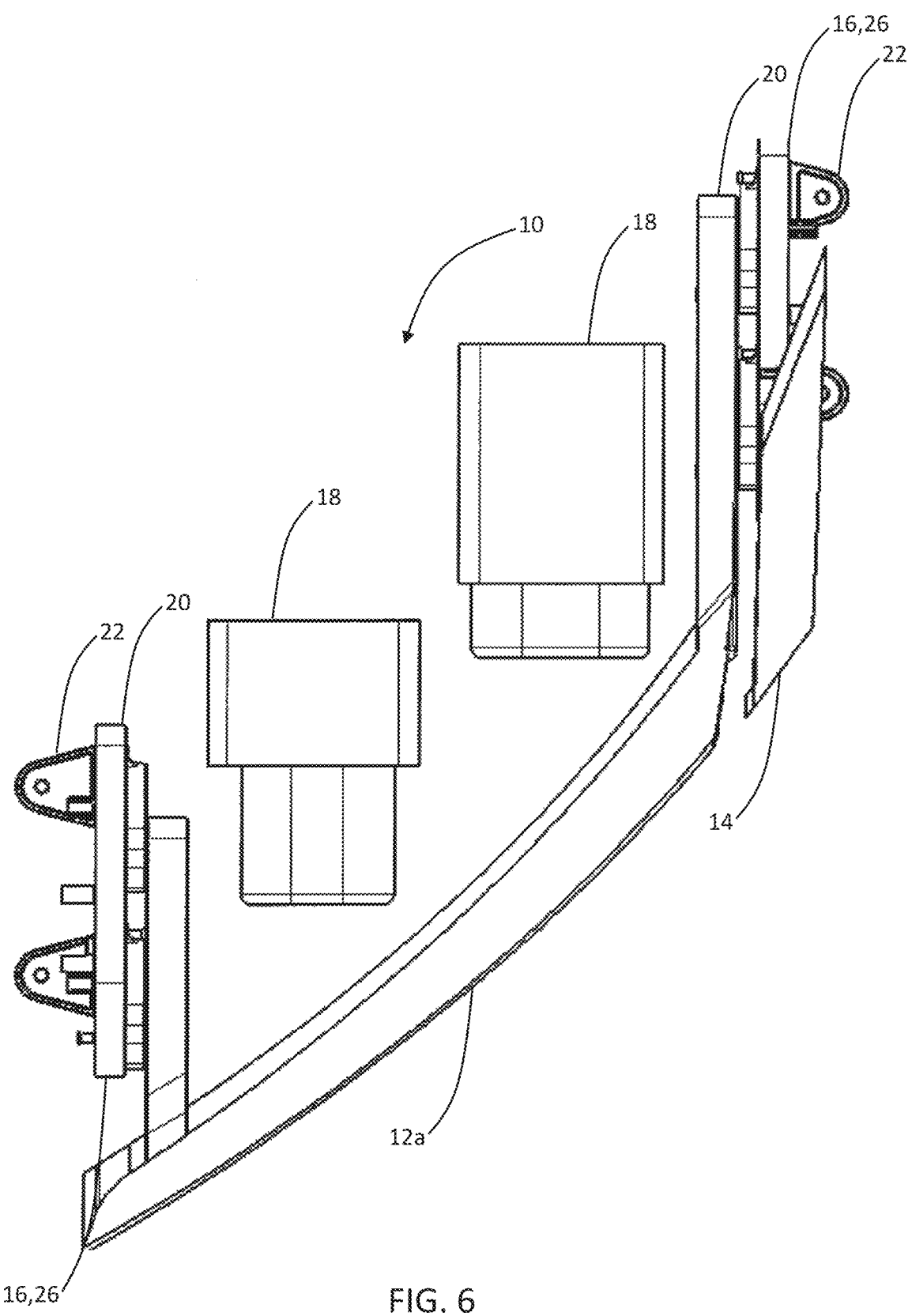
FIG. 6 is a partial top planar view of one exemplary embodiment of the vehicle light assembly provided herein, incorporating a pair of horizontal movable light signature members, a vertical stationary light signature member, low beam/high beam light units, and a pair of actuation mechanisms, in a closed configuration.

FIG. 6 provides a view of the light assembly 10 from the top and also highlights the relative position of the low beam/high beam units 18. In this exemplary embodiment, the horizontal movable light signature members 12a,12b are "swept back" from the end remote from the vertical stationary light signature member 14 to the end proximate the vertical stationary light signature member 14, and one of the low beam/high beam units 18 and actuation mechanisms 16 is "set back" from the other of the low beam/high beam units 18 and actuation mechanisms 16. An essentially "square" configuration could of course also be utilized.

Figure 7:
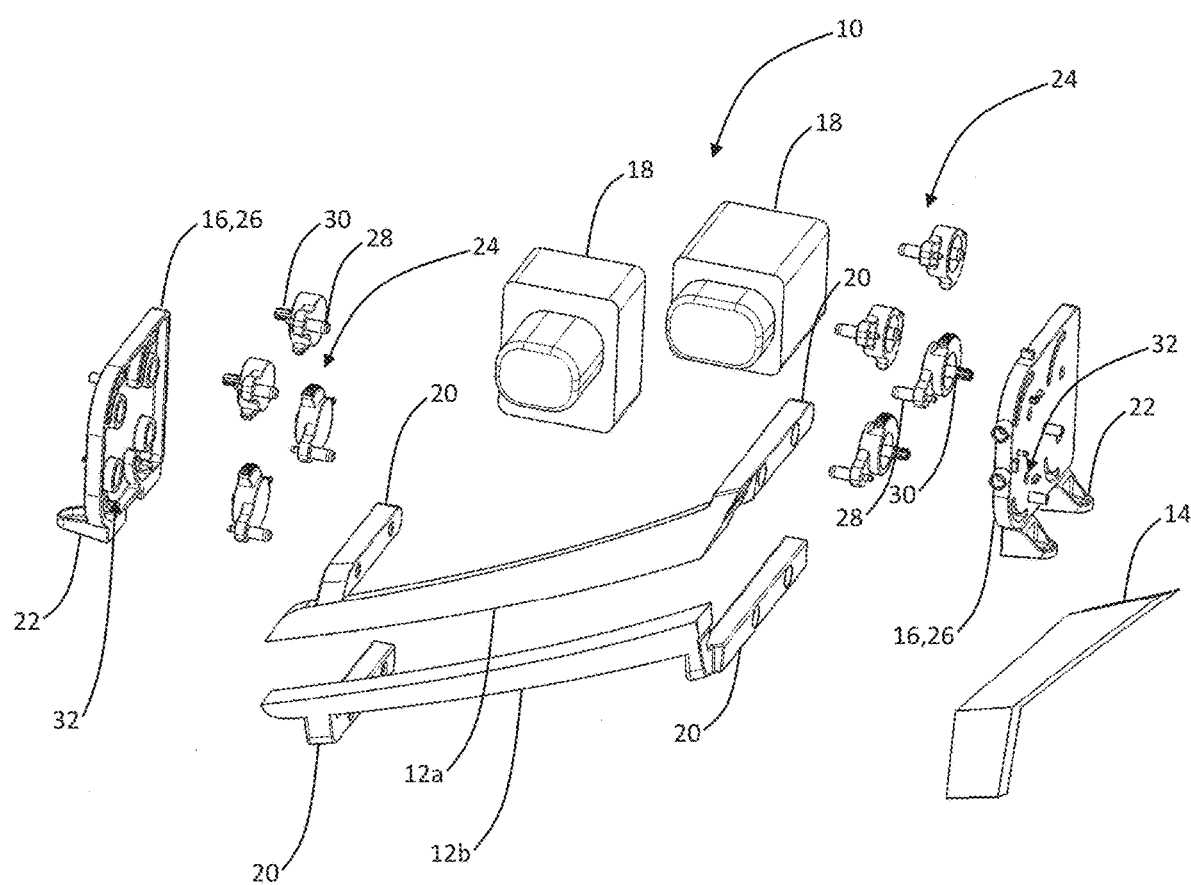
FIG. 7 is a partial front exploded perspective view of one exemplary embodiment of the vehicle light assembly provided herein, incorporating a pair of horizontal movable light signature members, a vertical stationary light signature member, low beam/high beam light units, and a pair of actuation mechanisms, in a partially open/partially closed configuration.

FIG. 7 is a partial front exploded perspective view of the light assembly 10, incorporating the pair of horizontal movable light signature members 12a,12b, the vertical stationary light signature member 14, the low beam/high beam light units 18, and the pair of actuation mechanisms 16, in a partially open/partially closed configuration. Each actuation mechanism 16 includes the plurality of gears 24 rotatably coupled to the tray structure 26. The coupling members 20 associated with each of the horizontal movable light signature members 12a,12b are pivotably coupled to the plurality of gears 24 via the plurality of pins 28 or the like, such that when the plurality of gears 24 are rotated, the coupling members 20 and associated horizontal movable light signature members 12a,12b are rotated about the plurality of gears 24, actuation mechanisms 16, and low beam/high beam units 18. Here, each of the gears 24 includes a post 30 that is disposed and secured through and associated port 32 manufactured through or on an interior surface of the associated tray structure 26, such that the gear 24 may rotate (or be rotated) with respect to the tray structure 26.

Figure 8:
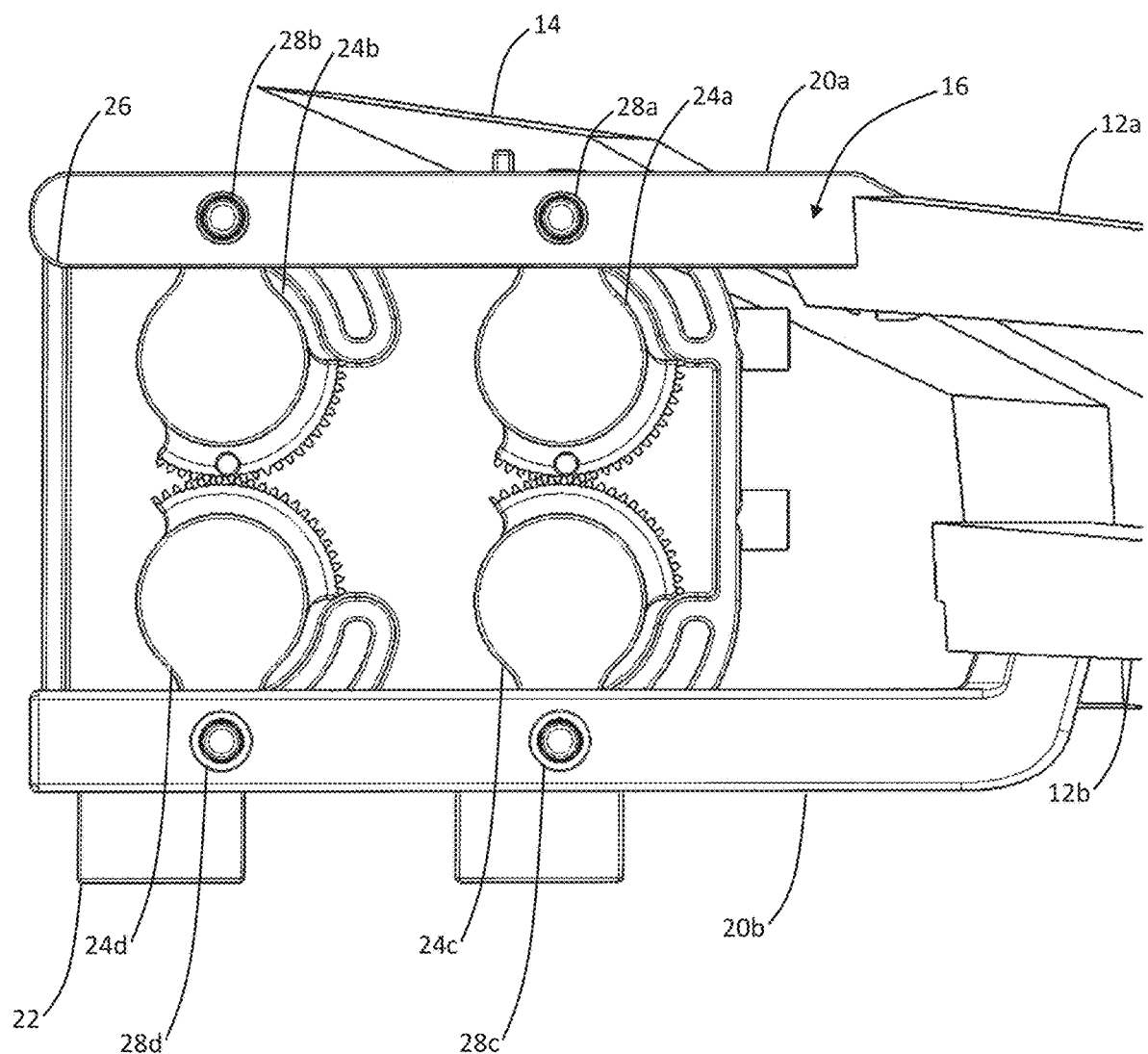
FIG. 8 is a side planar view of one exemplary embodiment of the light signature actuation mechanism for the vehicle light assembly provided herein.

Referring now specifically to FIG. 8, one exemplary embodiment of the actuation mechanism 16 is illustrated, utilizing a plurality of upper gears 24a,24b that are arranged linearly, rotatably coupled to the associated tray structure 26, and pivotably coupled to the upper coupling member 20a associated with the upper horizontal movable light signature member 12a via pins 28a,28b. Likewise, a plurality of lower gears 24c,24d are arranged linearly, rotatably coupled to the associated tray structure 26, and pivotably coupled to the lower coupling member 20b associated with the lower horizontal movable light signature member 12b via pins 28c,28d. In this exemplary embodiment, any of the gears 24a,24b,24c,24d can be a drive gear, but only select gears 24a,24c and 24b,24d are directly coupled, with all gears 24a,24b,24c,24d rotating and both coupling members 20a,20b and horizontal movable light signature members 12a,12b pivoting and translating in unison. This provides a robust and durable configuration that sacrifices some economy of space, as the lines of gears are "stacked" on top of each other.

Figure 9:
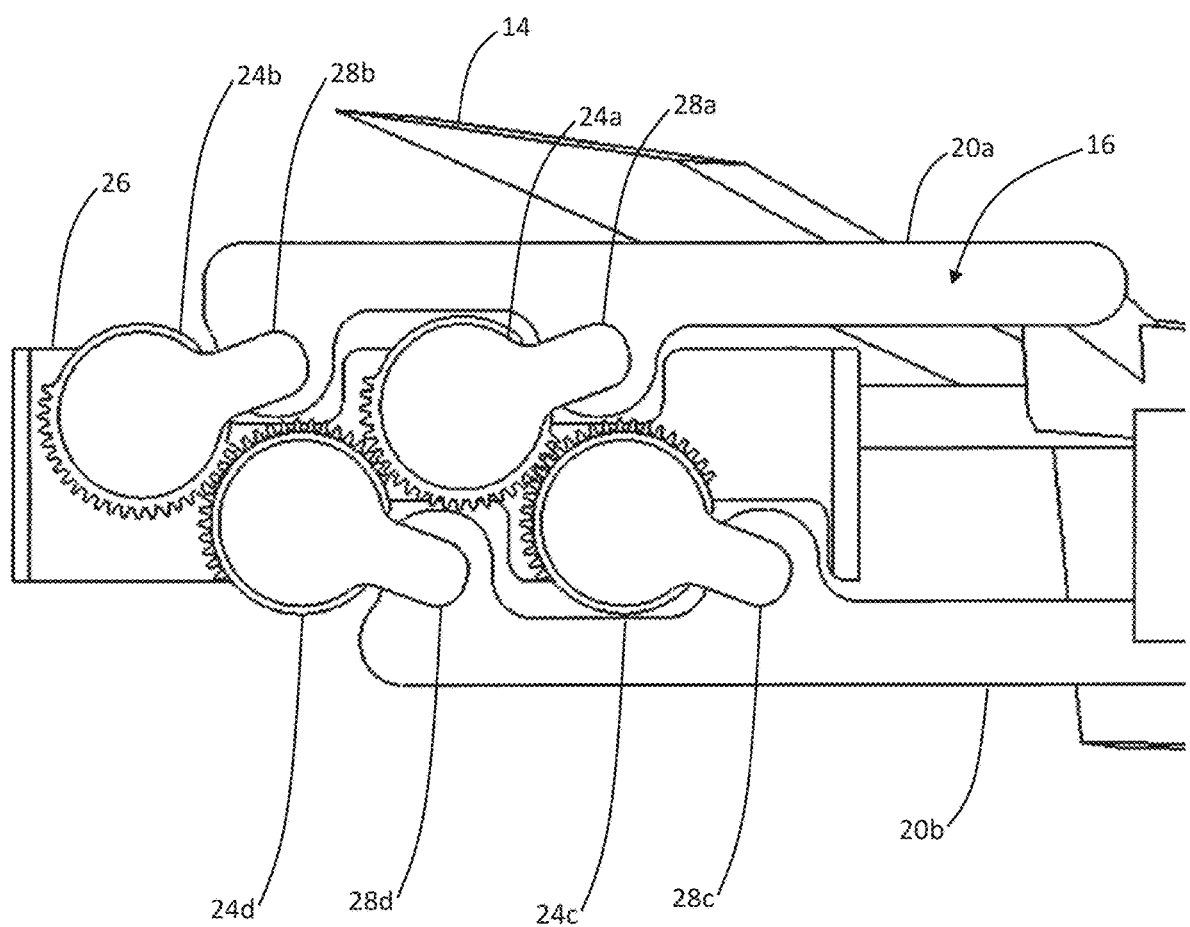
FIG. 9 is a side planar view of another exemplary embodiment of the light signature actuation mechanism for the vehicle light assembly provided herein.

Referring now specifically to FIG. 9, another exemplary embodiment of the actuation mechanism 16 is illustrated, again utilizing a plurality of upper gears 24a,24b that are arranged linearly, rotatably coupled to the associated tray structure 26, and pivotably coupled to the upper coupling member 20a associated with the upper horizontal movable light signature member 12a via pins 28a,28b. Likewise, a plurality of lower gears 24c,24d are arranged linearly, rotatably coupled to the associated tray structure 26, and pivotably coupled to the lower coupling member 20b associated with the lower horizontal movable light signature member 12b via pins 28c,28d. In this exemplary embodiment, any of the gears 24a,24b,24c,24d can be a drive gear, but all gears 24c,24a,24d,24b are coupled in sequence, with all gears 24a,24b,24c,24d rotating and both coupling members 20a,20b and horizontal movable light signature members 12a,12b pivoting and translating in unison. This provides a robust and durable configuration that promotes economy of space, as the lines of gears are "intertwined" with each other.

Figure 10:
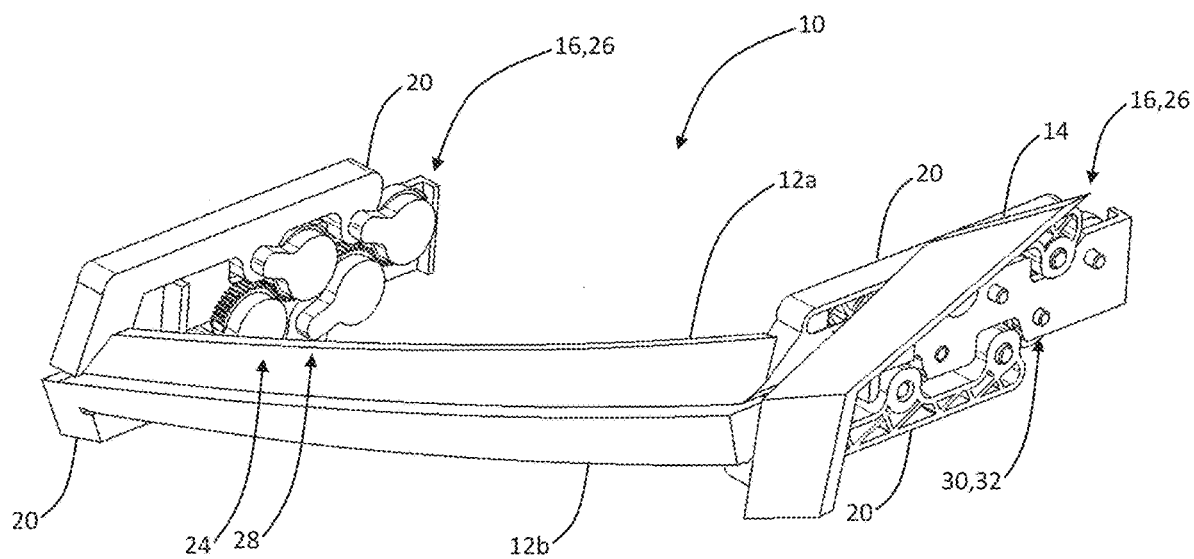
FIG. 10 is a partial front perspective view of another exemplary embodiment of the vehicle light assembly provided herein, incorporating a pair of horizontal movable light signature members, a vertical stationary light signature member, and a pair of actuation mechanisms, in a closed configuration.

FIG. 10 is a partial front perspective view of another exemplary embodiment of the vehicle light assembly 10 provided herein, incorporating the pair of horizontal movable light signature members 12a,12b, the vertical stationary light signature member 14, and the pair of actuation mechanisms 16, in a closed configuration. Here, the shape and configuration of the various components is simply modified to fit a given application, with everything functioning in a similar manner. Such modifications are contemplated herein.

Figure 11:
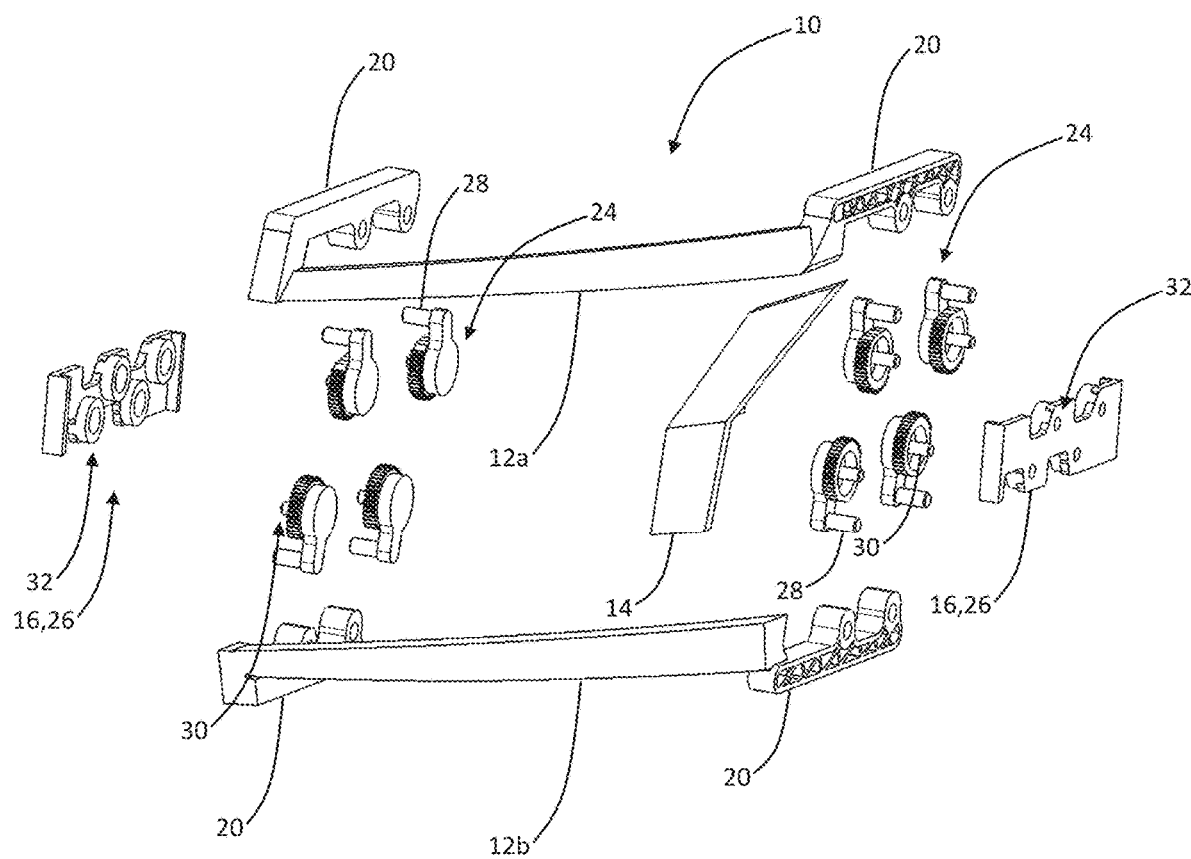
FIG. 11 is a partial front exploded perspective view of another exemplary embodiment of the vehicle light assembly provided herein, incorporating a pair of horizontal movable light signature members, a vertical stationary light signature member, and a pair of actuation mechanisms, in an open configuration.

FIG. 11 is a partial front exploded perspective view of another exemplary embodiment of the vehicle light assembly 10 provided herein, incorporating the pair of horizontal movable light signature members 12a,12b, the vertical stationary light signature member 14, and the pair of actuation mechanisms 16. Again, the shape and configuration of the various components is simply modified to fit a given application, with everything functioning in a similar manner. Such modifications are contemplated herein.

Figure 12:
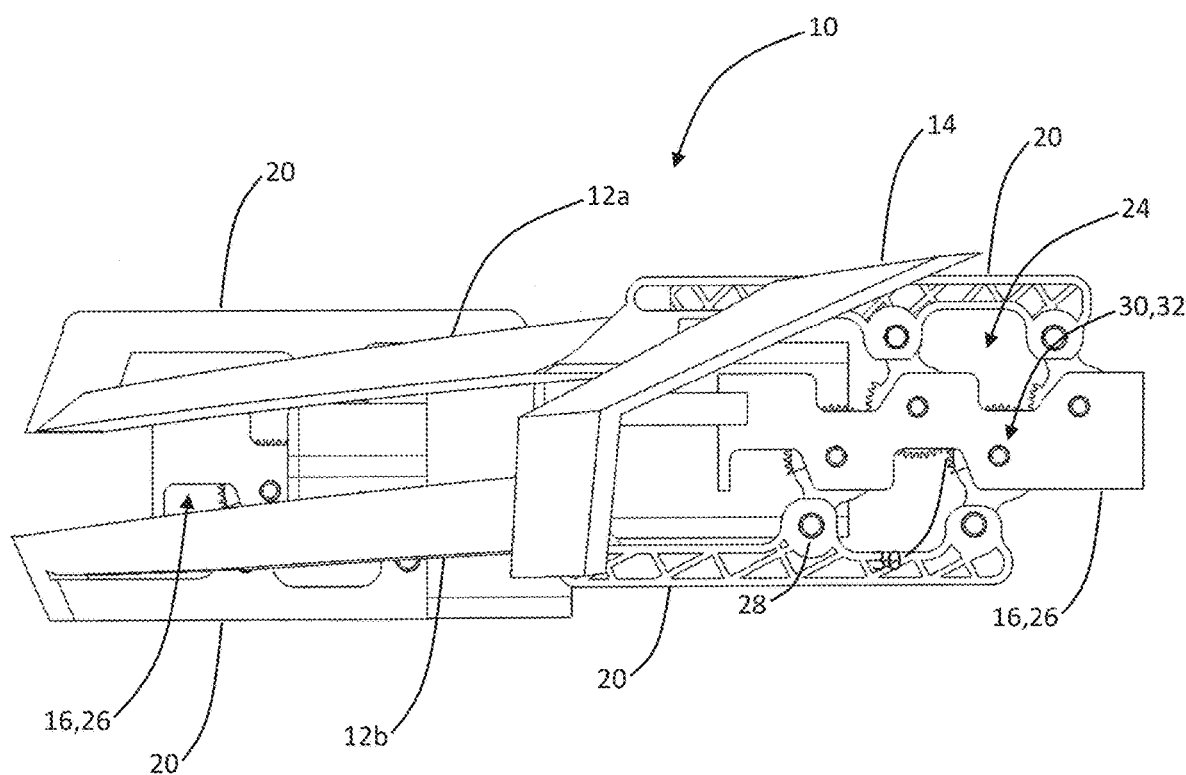
FIG. 12 is a partial front perspective view of a further exemplary embodiment of the vehicle light assembly provided herein, incorporating a pair of horizontal movable light signature members, a vertical stationary light signature member, low beam/high beam light units, and a pair of actuation mechanisms, in an open configuration.

FIG. 12 is a partial front perspective view of a further exemplary embodiment of the vehicle light assembly 10 provided herein, incorporating the pair of horizontal movable light signature members 12a,12b, the vertical stationary light signature member 14, and the pair of actuation mechanisms 16, in an open configuration. Here, the shape and configuration of the various components is simply modified to fit a different application, with everything functioning in a similar manner. Such modifications are contemplated herein.

Figure 13:
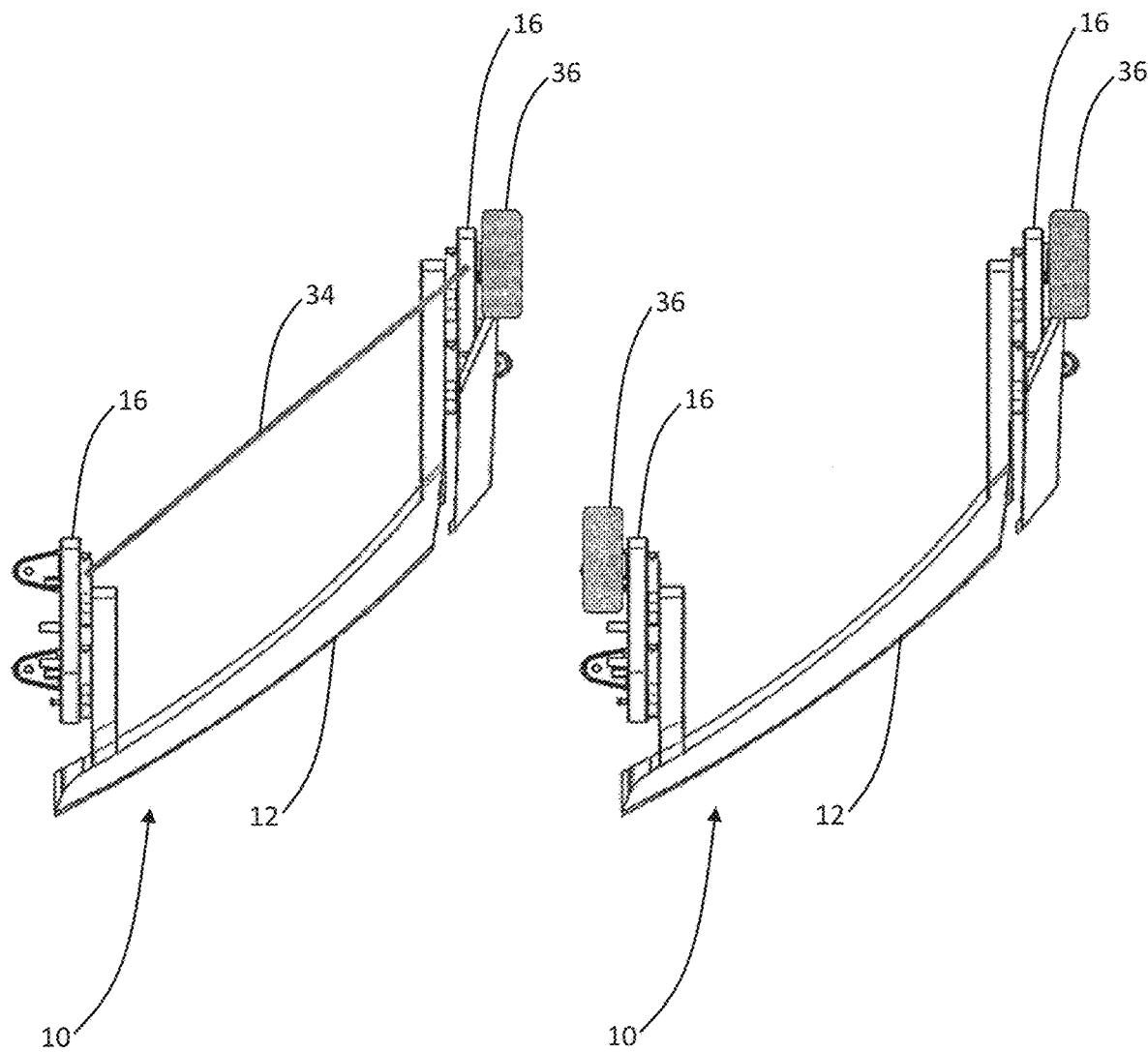
FIG. 13 is a pair of partial top planar views of one exemplary embodiment of the vehicle light assembly provided herein, utilizing both one and two actuation motor configurations.

FIG. 13 illustrates that the actuation mechanisms 16 disposed on either side of the light assembly 10 can be collectively or independently driven. Optionally, one actuation mechanism 16 acts as a drive actuation mechanism 16 and is coupled to a follower actuation mechanism 16 via a mechanical link 36. In this case, a drive motor 36 is coupled directly to the only the drive actuation mechanism 16. Alternatively, both actuation mechanisms 16 act as drive actuation mechanisms 16. In this case, a drive motor 36 is coupled directly to both drive actuation mechanisms 16. Preferably, theses dual drive motors 36 are commonly controlled and are synced to operate in unison, such that both sides of the horizontal movable light signature members 12a,12a are actuated evenly and no twisting results.

Figure 14:
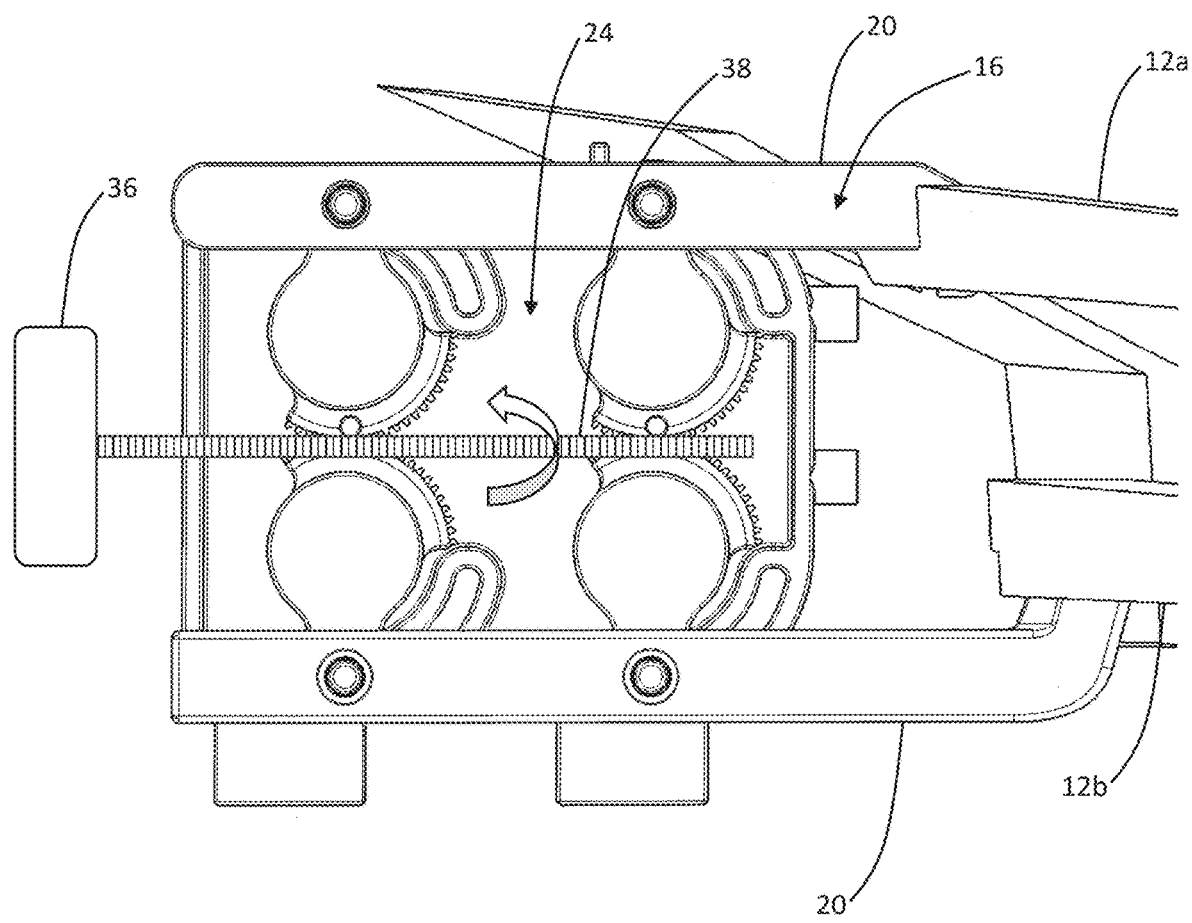
FIG. 14 is a side planar view illustrating one exemplary actuation motor setup utilized herein.

FIG. 14 schematically illustrates one method by which the actuation mechanism 16 is driven by the actuation motor 36, in either a one-motor or two-motor setup. The actuation motor 36 is coupled to a rotating (or translating) actuation member 38 that is coupled to or otherwise actuates one or more of the gears 24 (or other actuation structures), thereby actuating any coupled gears 24 (or other actuation structures), the associated coupling members 20, and the associated horizontal movable light signature members 12a,12b.

Figure 15:
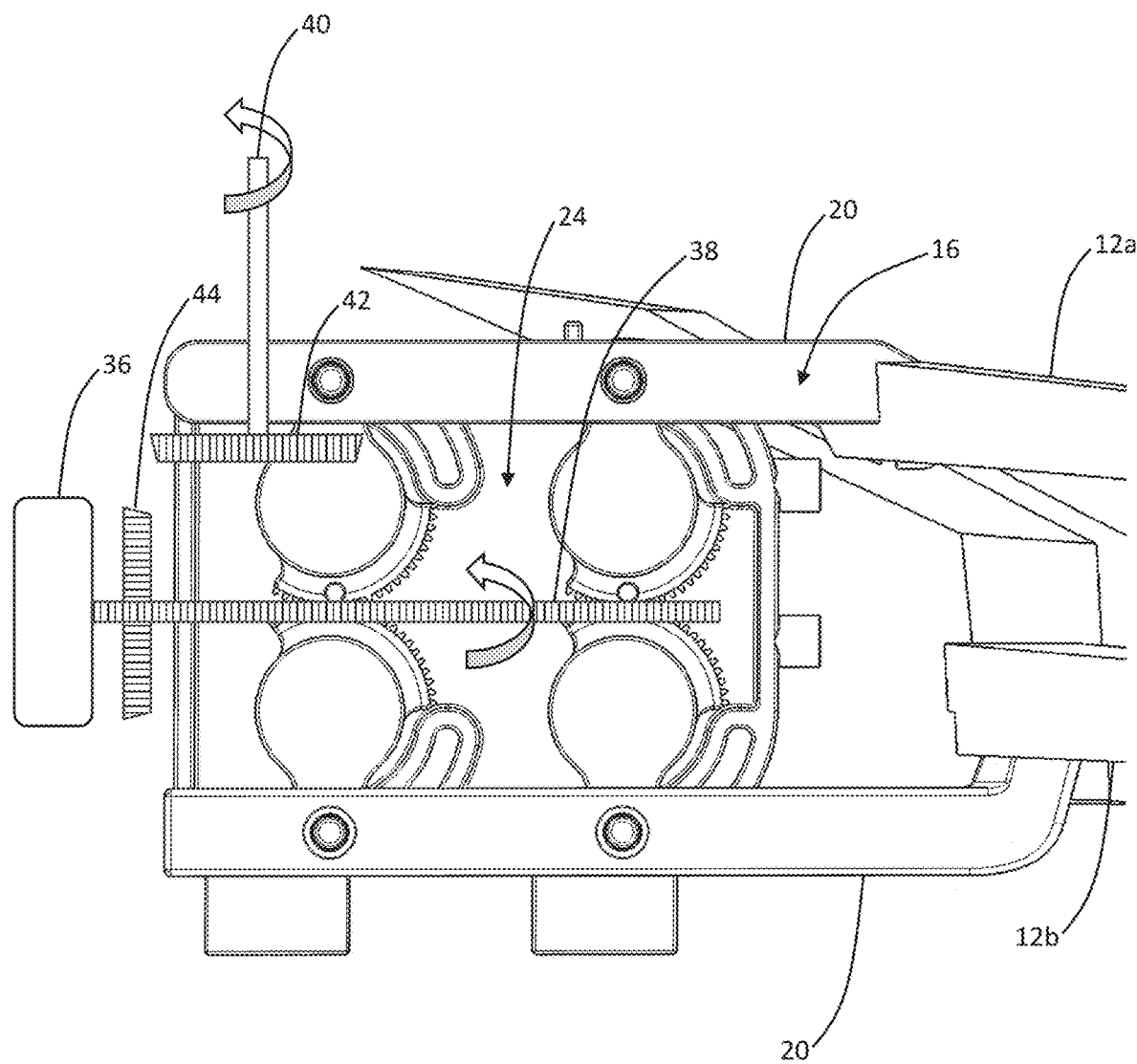
FIG. 15 is a side planar view illustrating another exemplary actuation motor setup utilized herein, incorporating a parallel manual actuation mechanism as well in a disengaged configuration.
Figure 16:
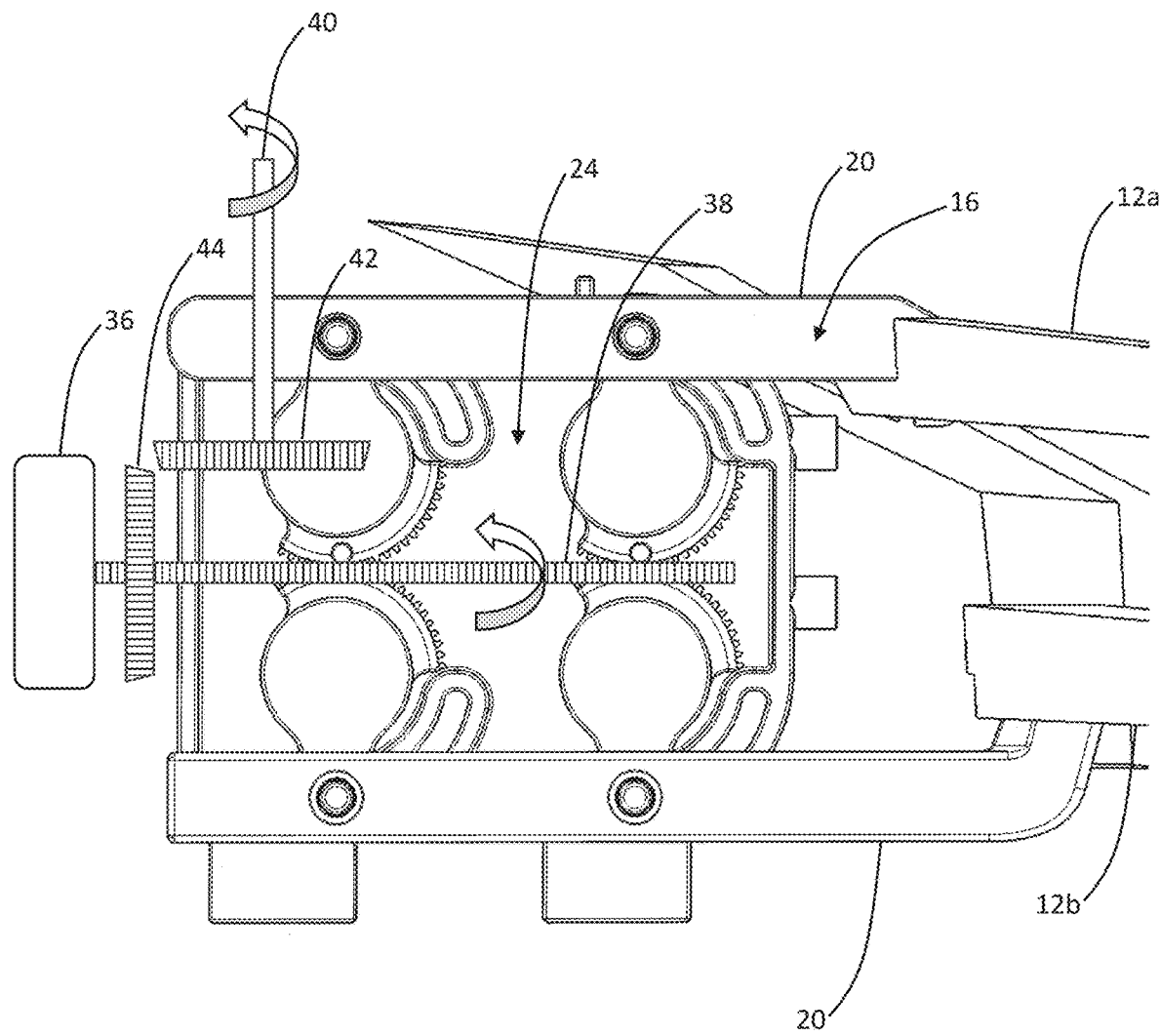
FIG. 16 is a side planar view illustrating another exemplary actuation motor setup utilized herein, incorporating a parallel manual actuation mechanism as well in an engaged configuration.

FIGS. 15 and 16 schematically illustrate another method by which the actuation mechanism 16 is driven by the actuation motor 36, in either a one-motor or two-motor setup. The actuation motor 36 is again coupled to a rotating (or translating) actuation member 38 that is coupled to or otherwise actuates one or more of the gears 24 (or other actuation structures), thereby actuating any coupled gears 24 (or other actuation structures), the associated coupling members 20, and the associated horizontal movable light signature members 12a,12b. Here, if the actuation motor 36 fails or power is lost, the rotating (or translating) actuation member 38 can be manually actuated by a manual actuation member 40 that is provided as part of the actuation mechanism 16. The manual actuation member 40 includes a drive gear 42 that is configured to be deployed into contact with and rotationally actuate a follower gear 44 coupled to the actuation member 38. FIG. 15 shows the manual actuation member 40 in a withdrawn configuration. FIG. 16 shows the manual actuation member 40 in an engaged configuration.

Figure 17:
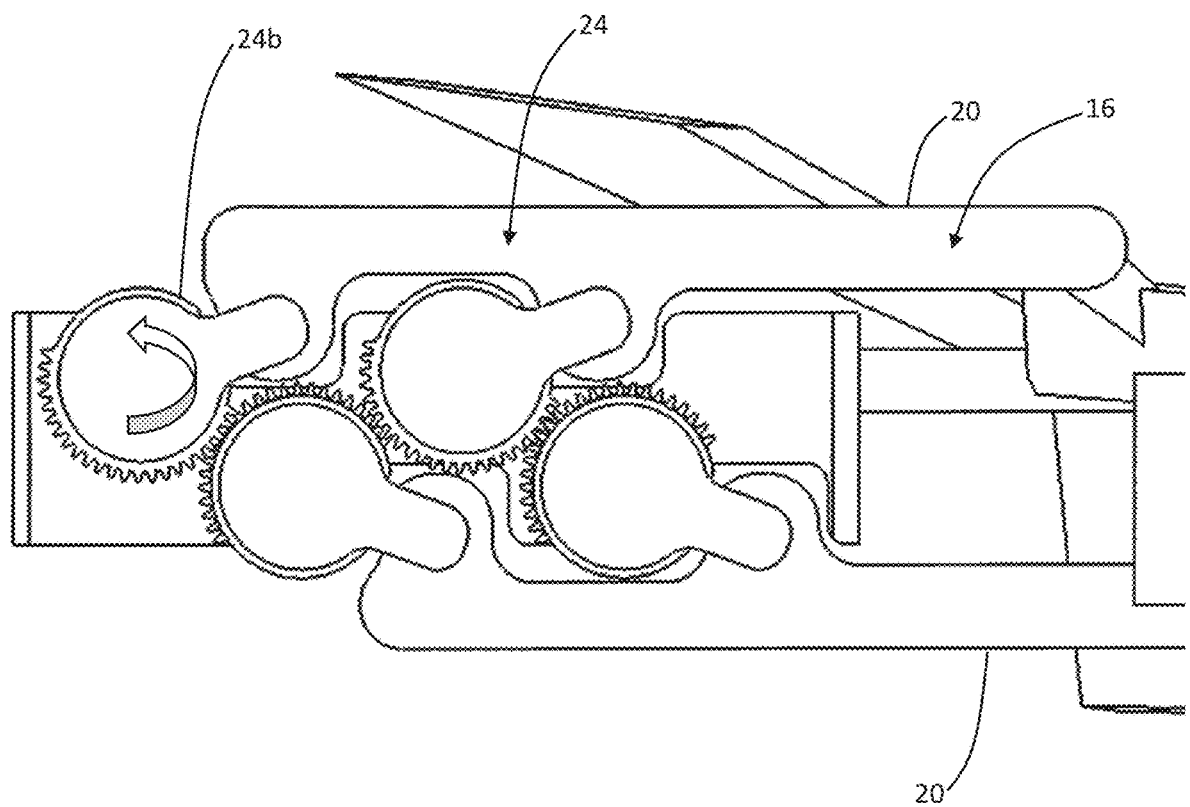
FIG. 17 is a side planar view illustrating a further exemplary actuation motor setup utilized herein.

FIG. 17 schematically illustrates a further method by which the actuation mechanism 16 is driven by the actuation motor 36, in either a one-motor or two-motor setup. The actuation motor 36 is coupled to and directly actuates one of the gears 24b (or other actuation structures), thereby actuating any coupled gears 24 (or other actuation structures), the associated coupling members 20, and the associated horizontal movable light signature members 12a,12b.

Figure 18:
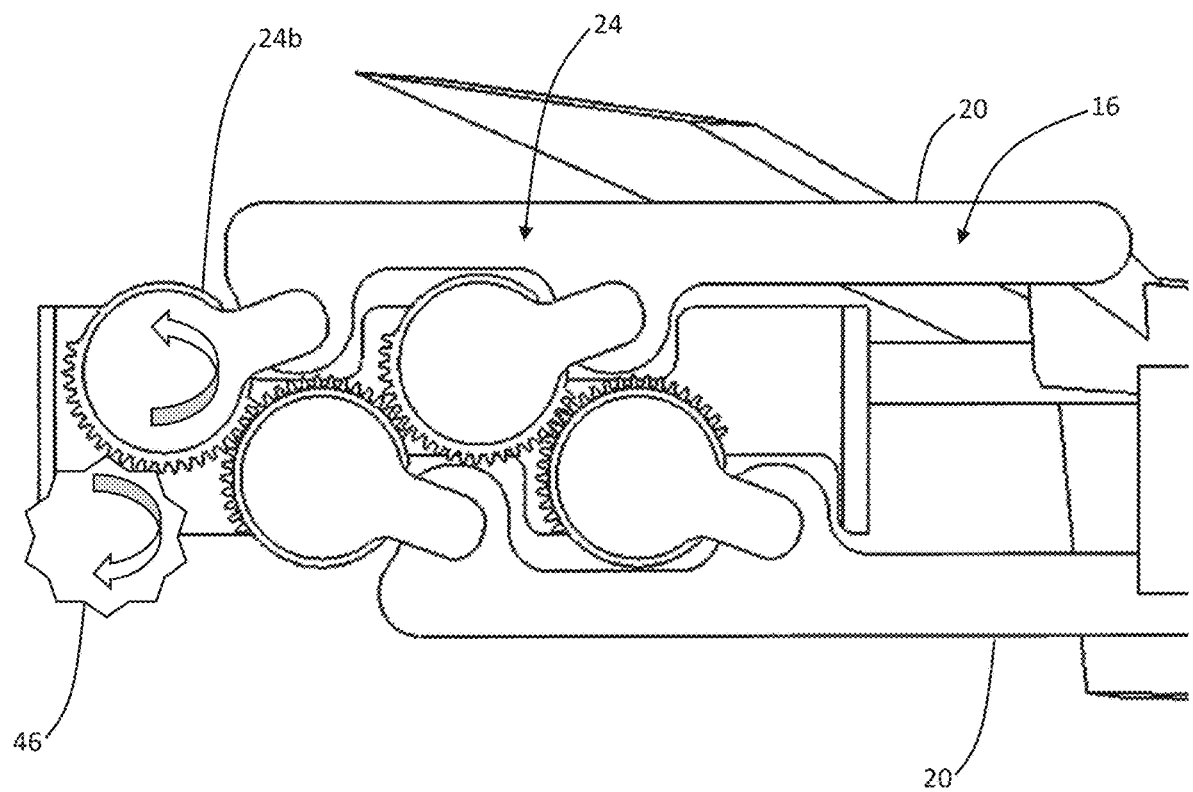
FIG. 18 is a side planar view illustrating a still further exemplary actuation motor setup utilized herein.

FIG. 18 schematically illustrates a still further method by which the actuation mechanism 16 is driven by the actuation motor 36, in either a one-motor or two-motor setup. The actuation motor 36 is coupled to and directly actuates one of the gears 24b (or other actuation structures) through a drive gear 46, thereby actuating any coupled gears 24 (or other actuation structures), the associated coupling members 20, and the associated horizontal movable light signature members 12a,12b.

Figure 19:
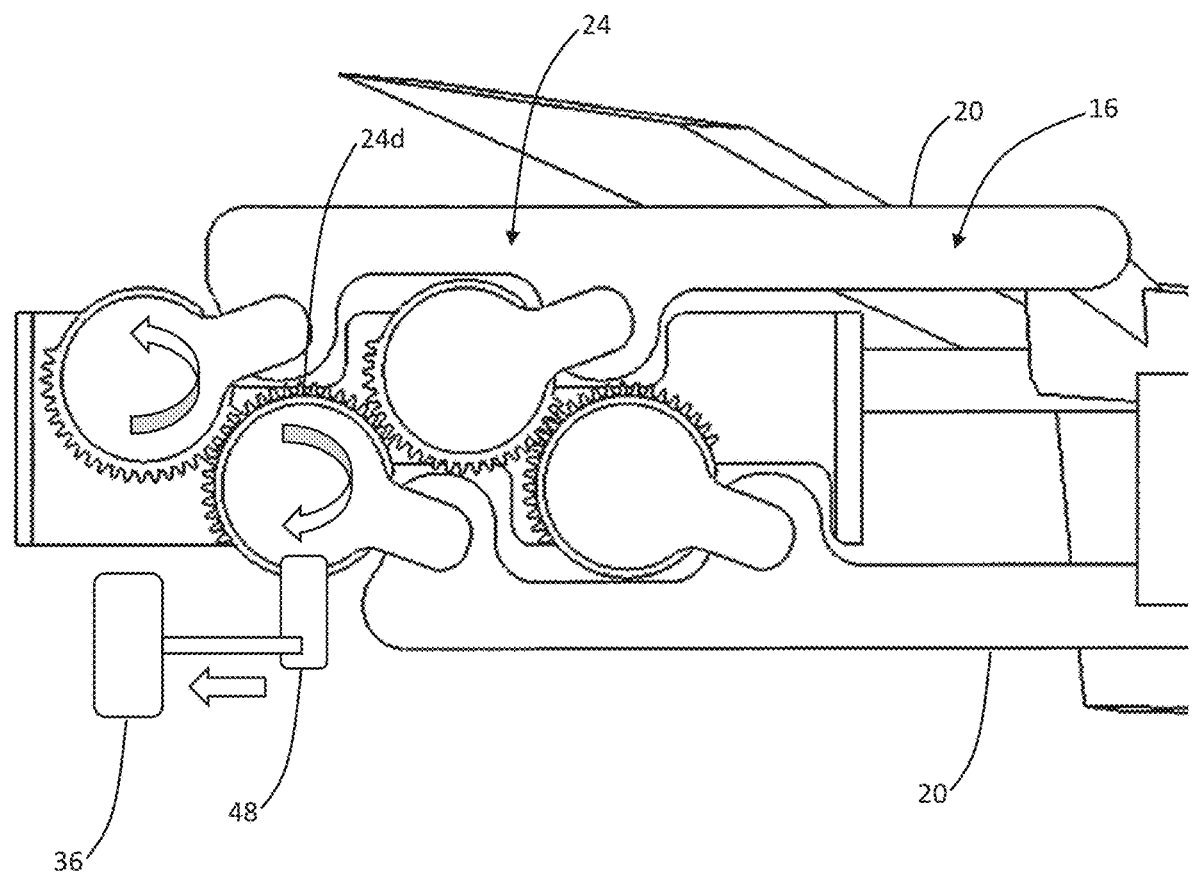
FIG. 19 is a side planar view illustrating a still further exemplary actuation motor setup utilized herein.

FIG. 19 schematically illustrates a still further method by which the actuation mechanism 16 is driven by the actuation motor 36, in either a one-motor or two-motor setup. The actuation motor 36 is coupled to and directly actuates one of the gears 24d (or other actuation structures) through a translating drive link 48, thereby actuating any coupled gears 24 (or other actuation structures), the associated coupling members 20, and the associated horizontal movable light signature members 12a,12b.

Figure 20:
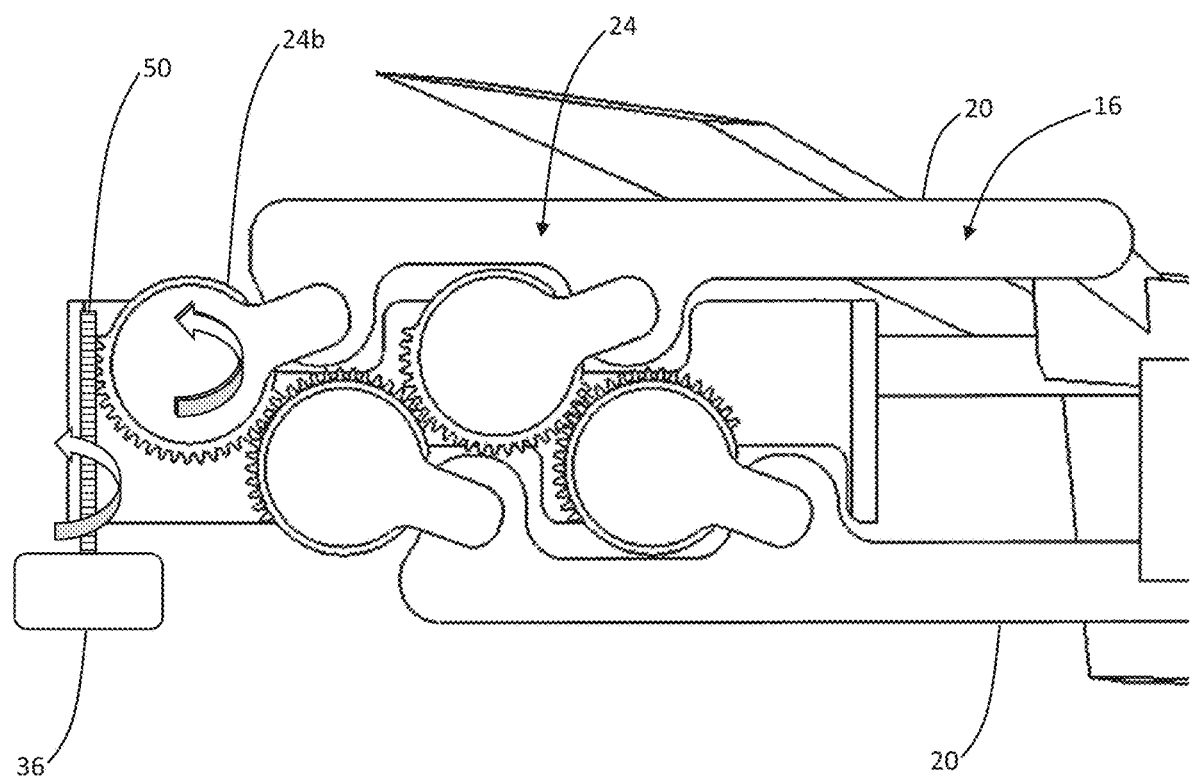
FIG. 20 is a side planar view illustrating a still further exemplary actuation motor setup utilized herein.

Finally, FIG. 20 schematically illustrates a still further method by which the actuation mechanism 16 is driven by the actuation motor 36, in either a one-motor or two-motor setup. The actuation motor 36 is coupled to and directly actuates one of the gears 24b (or other actuation structures) through a rotating drive link 50, thereby actuating any coupled gears 24 (or other actuation structures), the associated coupling members 20, and the associated horizontal movable light signature members 12a,12b.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described herein may be implemented in hardware, software, firmware, or any combination thereof. If implemented in software, the functions may be stored or transmitted as one or more instructions or code on a computer-readable medium and executed by a hardware-based processing unit. Computer-readable media may include computer-readable storage media, which corresponds to a tangible medium, such as data storage media, or communication media, including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable programmable read-only memory (EEPROM), compact disc read-only memory (CD-ROM), or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies, such as infrared, radio, and microwave, then the coaxial cable, fiber optic cable, twisted pair, DSL, or wireless technologies, such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

The invention claimed is:

1. A vehicle light assembly, comprising:
a light unit; and
a pair of movable light signature members disposed adjacent to the light unit, wherein the pair of movable light signature members are adapted to be moved from a closed position adjacent to each other and in a light projection path of the light unit to an open position spaced apart from each other and removed from the light projection path of the light unit, and wherein corresponding ends of each of the pair of movable light signature members are coupled together via one or more gears such that each of the pair of movable light signature members moves from the closed position to the open position in unison while maintaining a substantially parallel horizontal configuration.

2. The vehicle light assembly of claim 1, wherein the pair of movable light signature members each comprise one or more light-emitting devices.

3. The vehicle light assembly of claim 1, further comprising one or more stationary light signature members disposed adjacent to the pair of movable light signature members.

4. The vehicle light assembly of claim 3, wherein the one or more stationary light signature members each comprise one or more light-emitting devices.

5. The vehicle light assembly of claim 3, wherein the one or more stationary light signature members each comprise an elongate structure disposed in a substantially vertical configuration.

6. The vehicle light assembly of claim 1, wherein the pair of movable light signature members comprise a first movable light signature member and a second movable light signature member, wherein the first movable light signature member and the second movable light signature member are adapted to be moved vertically from the closed position adjacent to each other and in the light projection path of the light unit to the open position spaced apart from each other and removed from the light projection path of the light unit.

7. The vehicle light assembly of claim 6, wherein the first movable light signature member and the second movable light signature member each comprise an elongate structure disposed in a substantially horizontal configuration.

8. The vehicle light assembly of claim 1, further comprising one or more actuation mechanisms each adapted to one or more of rotate, pivot, and translate the pair of movable light signature members from the closed position to the open position.

9. The vehicle light assembly of claim 8, further comprising one or more coupling mechanisms coupled between the pair of movable light signature members and the one or more actuation mechanisms.

10. A vehicle light signature assembly, comprising:
a pair of movable light signature members, wherein the pair of movable light signature members are adapted to be moved from a closed position adjacent to each other and in a light projection path of a light unit to an open position spaced apart from each other and removed from the light projection path of the light unit, and wherein corresponding ends of each of the pair of movable light signature members are coupled together via one or more gears such that each of the pair of movable light signature members moves from the closed position to the open position in unison while maintaining a substantially parallel horizontal configuration.

11. The vehicle light signature assembly of claim 10, wherein the pair of movable light signature members each comprise one or more light-emitting devices.

12. The vehicle light signature assembly of claim 10, further comprising one or more stationary light signature members disposed adjacent to the pair of movable light signature members.

13. The vehicle light signature assembly of claim 12, wherein the one or more stationary light signature members each comprise one or more light-emitting devices.

14. The vehicle light signature assembly of claim 12, wherein the one or more stationary light signature members each comprise an elongate structure disposed in a substantially vertical configuration.

15. The vehicle light signature assembly of claim 10, wherein the pair of movable light signature members comprise a first movable light signature member and a second movable light signature member, wherein the first movable light signature member and the second movable light signature member are adapted to be moved vertically from the closed position adjacent to each other and in the light projection path of the light unit to the open position spaced apart from each other and removed from the light projection path of the light unit.

16. The vehicle light signature assembly of claim 15, wherein the first movable light signature member and the second movable light signature member each comprise an elongate structure disposed in a substantially horizontal configuration.

17. The vehicle light signature assembly of claim 10, further comprising one or more actuation mechanisms each adapted to one or more of rotate, pivot, and translate the pair of movable light signature members from the closed position to the open position.

18. The vehicle light signature assembly of claim 17, further comprising one or more coupling mechanisms coupled between the pair of movable light signature members and the one or more actuation mechanisms.

* * * * *